(12) United States Patent
Bergeron

(10) Patent No.: US 8,239,047 B1
(45) Date of Patent: Aug. 7, 2012

(54) SYSTEMS AND METHODS FOR INDIRECT CONTROL OF PROCESSOR ENABLED DEVICES

(76) Inventor: Bryan Bergeron, Brookline, MA (US)

( * ) Notice: Subject to any disclaimer, the term of this patent is extended or adjusted under 35 U.S.C. 154(b) by 465 days.

(21) Appl. No.: 12/503,471

(22) Filed: Jul. 15, 2009

(51) Int. Cl.
*G05B 15/00* (2006.01)
*G05B 19/18* (2006.01)
*G05B 11/01* (2006.01)
*A63F 9/24* (2006.01)
*G06F 15/18* (2006.01)
*G06N 3/08* (2006.01)

(52) U.S. Cl. ............... 700/83; 700/2; 700/11; 700/17; 700/20; 700/23; 463/47; 706/25

(58) Field of Classification Search .......... 700/83, 700/2, 11, 17, 20, 23; 463/47; 706/25
See application file for complete search history.

(56) References Cited

U.S. PATENT DOCUMENTS

| | | | |
|---|---|---|---|
| 4,716,804 A | 1/1988 | Chadabe | |
| 5,286,907 A | 2/1994 | Okamura et al. | |
| 5,287,430 A * | 2/1994 | Iwamoto et al. | 706/20 |
| 5,673,367 A | 9/1997 | Buckley | |
| 6,069,567 A | 5/2000 | Zawilski | |
| 6,157,724 A | 12/2000 | Kawakami | |
| 6,766,025 B1 | 7/2004 | Levy et al. | |
| 7,058,190 B1 | 6/2006 | Zakarauskas et al. | |
| 2003/0149603 A1* | 8/2003 | Ferguson et al. | 705/7 |
| 2004/0248071 A1 | 12/2004 | Bedziouk et al. | |
| 2005/0286697 A1 | 12/2005 | Bathurst et al. | |
| 2006/0090632 A1 | 5/2006 | Ludwig | |
| 2006/0223637 A1* | 10/2006 | Rosenberg | 463/47 |
| 2007/0076906 A1* | 4/2007 | Takagi et al. | 381/118 |
| 2007/0150081 A1* | 6/2007 | Nixon et al. | 700/83 |
| 2007/0189549 A1 | 8/2007 | Scheel et al. | |
| 2007/0227344 A1* | 10/2007 | Ryle et al. | 84/723 |
| 2008/0282873 A1* | 11/2008 | Kotton et al. | 84/645 |
| 2010/0292868 A1* | 11/2010 | Rotem et al. | 701/2 |

OTHER PUBLICATIONS

Bonsor, K., "How Computer Clothing Works," HowStuffWorks, http://computer.howstuffworks.com/computer-clothing.htm/printable, printed Feb. 16, 2009.
Card, O.S., Ender's Game, Tom Doherty Associates (1985).
Chebat, D.R. et al., "Navigation Skills in the Early Blind Using a Tongue Stimulator," Soc. Neurosci. Abstr (2007), http://tonguevision.blogspot.com/2008/02/society-for-neuroscience-2007-press.html.
Johnston, A. et al., "Amplifying Reflective Thinking in Musical Performance," http://delivery.acm.org/10.1145/1060000/1056248/p166-johnston.pdf?key1=1056248&key2=9206433421&coll=GUIDE&dl=GUIDE&CFID=7491889&CFTOKEN=31864637 (2007) pp. 166-175.

(Continued)

*Primary Examiner* — Albert DeCady
*Assistant Examiner* — Jason Lin
(74) *Attorney, Agent, or Firm* — Frost Brown Todd LLC

(57) ABSTRACT

Individuals can operate processor enabled devices at a high level of performance, even if they have little or no familiarity with those devices, by indirectly operating them through a first processor enabled device. The direct interactions of individuals with a familiar device can be communicated to one or more processors that perform signal processing functions in order to generate control signals that direct the operation of a second, unfamiliar processor-enabled device. In this closed-loop system, individuals can receive real-time feedback on the performance of the second device in a form associated with the operation of the first device.

17 Claims, 7 Drawing Sheets

OTHER PUBLICATIONS

Jot,M. "Real-time spatial processing of sounds for music, multimedia and interactive human-computer interfaces," http://www,springerlink.com/content/bj53d5u5uwd09pua/, 0942-4962 (Print) 1432-1882 (Online), vol. 7 (Jan. 1999).

Lifton, J.H., "Dual Reality: An Emerging Medium," Phd. Thesis. MIT (2007) http://www.media.mit.edu/resenv/pubs/theses/lifton_phd.pdf.

Merrill, D. et al., "Personalization, Expressivity, and Learnability of an Implicit Mapping Strategy for Physical Interfaces," Proc. of CHI 2005 Conference on Human Factors in Computing Systems, Extended Abstracts, ACM Press, Portland, OR (Apr. 2-7, 2005) pp. 2152-2161.

Wozniewskim M. et al., "A spatial interface for audio and music production," http://www.dafx.ca/proceedings/papers/p_271.pdf, (Sep. 18-20, 2006 Proc. of the 9$^{th}$ Int. Conference on Digital Audio Effects (DAFX-06) Montreal, Canada, pp. DAFX-271-274.

Guitar Hero—Wikipedia, the free encyclopedia, http://en.wikipedia.org/w/index.php?title=Guitar_Hero&oldid=302094327 ,pp. 1-14, reflects revision as it appeared on Jul. 14, 2009 at 7:19 p.m., and printed Mar. 4, 2012.

Guitar Hero—Wikipedia, the free encyclopedia, http://en.wikipedia.org/wiki/Guitar_Hero, pp. 1-20, printed Jul. 16, 2009.

* cited by examiner

SYSTEMS AND METHODS FOR INDIRECT CONTROL OF PROCESSOR ENABLED DEVICES

BACKGROUND

1. Field

The present invention generally relates to human-machine interfaces. Specific embodiments can be used for leveraging innate and previously trained skills and abilities for high performance at operating novel devices with minimal training.

2. Related Art

Given the wide variety of tools available in modern society, learning to operate new devices is one of the most important activities in many people's lives. Unfortunately, there are many barriers to this type of learning. For example, learning to operate an unfamiliar device can require an individual to first cognitively grasp the operation of the device and then develop the requisite physical dexterity to operate the device. This is a problem both for individuals, who are forced to repeat the learning process for each new device, as well as for businesses, for whom ongoing employee (re)training is a significant and growing expense category.

One approach to dealing with modern society's profusion of devices is to focus on individual training. There are a number of approaches which seek to make this individual training more effective. For example, intelligent tutoring systems attempt to tailor the learning experience to the needs of individuals, thereby maximizing efficiency and effectiveness of learning. Similarly, there are a variety of systems which use virtual reality (either alone or in combination with real world interaction) in an attempt to train individuals by allowing them to mimic the operation of unfamiliar devices in simulation. For example, there exist flight simulators in which the flight controls and seat are bolted to a dynamic platform, that can provide real and simulated feedback that is appropriate and expected for a given maneuver. However, even using expensive virtual/mixed reality systems or advanced intelligent tutoring technology, this type of education-based approach does not alter the basic obstacles of cognitively grasping the operation of an unfamiliar device, then developing the manual dexterity to use it.

Another approach to dealing with the profusion of available devices is to map the inputs of one device onto another. An example of this is a modeling synthesizer. Modeling synthesizers in the music industry are a form of mixed reality system in which processor-enabled wind, keyboard, and string instruments serve as the primary user interface and the output is modeled on instruments that may bear no resemblance to the controlling instrument and with which the user may not be familiar. However, because the output of the modeling synthesizer does not take the form expected for the device the user is operating, the user must be skilled at interpreting the synthesized sound directly, and therefore cognizant of how their interactions with the processor-enabled instrument influence the output signal. Similar learning curve problems have been experienced with technology that is intended to allow users to compensate for injuries to their sense organs. For example, when video camera images have been translated to a grid of electrodes placed on the tongue, substantial training is required to enable blind individuals to interpret basic shapes. See Chebat, D. R., Rainville, C., Ptito, M. "Navigation Skills in the Early Blind Using a Tongue Stimulator" Soc. Neurosci. Abstr. 2007.

Among other benefits, aspects of the present disclosure can be used to enable individuals to operate unfamiliar devices while eliminating or reducing one or more of the drawbacks which characterize the prior art.

SUMMARY

This document comprises a disclosure of various techniques that can be used for purposes such as enabling individuals to achieve a high level of performance in the indirect operation of a device with which they have little or no training by directly operating a first device with which they are familiar and skilled. By directly operating a first familiar device, individuals cause a control signal to be generated that, by virtue of signal processing, directs the operation of a second, processor-enabled device. In this type of closed-loop system, individuals interacting with the first device are presented with real-time feedback in the form typical of that associated with the operation of the first device, but that is actually indicative of the operation of the second, unfamiliar device. Furthermore, the first and second devices need not share similarities in physical structure or underlying operation.

As will be apparent to one of ordinary skill in the art in light of this disclosure, the teachings of this disclosure can be utilized in a variety of different implementations. Set forth herein are certain features which some such implementations may include. It should be understood that the implementations identified herein are intended to provide examples only of aspects of implementations which could be created based on this disclosure, and are not intended to indicate limits on potential implementations which are covered by the claims in this document or any other documents claiming the benefit of this document.

BRIEF DESCRIPTION OF THE DRAWINGS

The drawings and detailed description which follow are intended to be illustrative and are not intended to imply limitations on the scope of potential implementations of the disclosure set forth herein.

DETAILED DESCRIPTION

Figure 1:
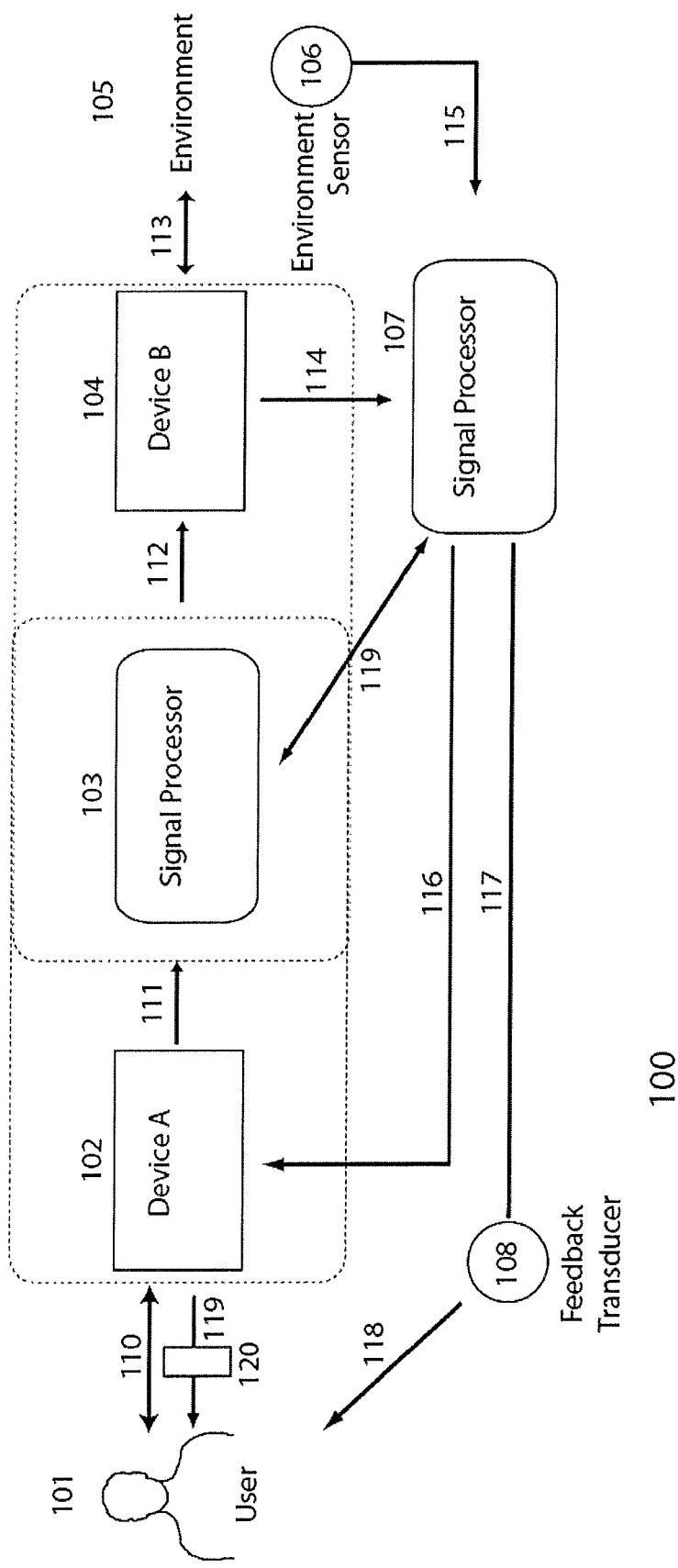
FIG. 1 depicts an exemplary generic high-level architecture which can be used to indirectly control a processor enabled device.

Turning now to the figures, FIG. 1 is an exemplary high-level architecture [100] of a system which could be implemented to enable a user [101] to indirectly control a remote device according to the teachings of this disclosure. In operation, one or more users [101] may directly manipulate or interact [110] with Device A [102], which, in some implementations, would be a device whose operation is familiar to the user(s) [101]. Device A [102] may consist of a single physical object or multiple, interconnected physical objects, each of which are considered part of a complete system. Device A [102] may comprise, for example, a video game console with a variety of attachments, including wireless controllers, speakers, audio amplifier, and video monitor. Another example of a multi-part Device A [102] is a TV with a wireless remote. In these two examples, the wireless controllers are considered part of Device A [102], and therefore contribute to the interaction [110].

As shown in FIG. 1, when the user [101] interacts with Device A [102], two types of feedback are generated. The first type of feedback, represented by the bidirectional arrow of interaction [110], is incidental feedback inherent in the operation of the device. The second type of feedback, represented by the unidirectional output arrow [119] is the characteristic output of the device. As a concrete illustration of the distinction between these two types of feedback, consider the case where device A [102] is an electric guitar. When a user [101] interacts with (i.e., uses) the electric guitar, the guitar will be expected to produce (and generally will produce) sound through an amplifier. This sound which is generally associated with the electric guitar is its characteristic output. The user [101] may also experience certain sensations other than the characteristic output [119] which exist simply by virtue of the nature of the electric guitar. These include, for example, the weight of the guitar, and the movement of its strings. Of course, it should be understood that this incidental feedback would likely differ between different device types, and may not be present at all in some instances. For example, if Device A [102] is a virtual or augmented reality guitar, then it may not have mass for the user [101] to sense, or its mass may be more or less than would be expected for a real instrument. Similarly, if Device A [102] were a steering controller attachment for a car race video game, it might present the user [101] with constant resistance to rotation, without the complex, nonlinear feedback inherent in the operation of a real car in a racing scenario.

In embodiments following the architecture of FIG. 1, when a user [101] interacts [110] with device A [102], the user [101] is generally exposed to the incidental feedback, but the characteristic output [119] may be completely or partially withheld. This may be accomplished by some type of isolation element [120] (for example, in the case where device A [102] is an electric guitar, the user [101] might be isolated from its sound by a set of headphones) or by using a modified version of the device which does not produce (or produces an attenuated version of) its characteristic output [119] (e.g., in the case of an electric guitar, the strings might be damped and there might not be a connection between them and an amplifier or speakers). In such a case, instead of, or in addition to, creating the characteristic output of device A [102], the user's [101] interaction produces an interaction signal [111] that is fed to the first signal processor [103]. This interaction signal [111] may originate from one or more sensors and one or more processors embedded within, attached to, or communicating with Device A [102]. Furthermore, the interaction signal [111] can originate from the native signal output of the device, such as the analog audio output from the magnetic and/or piezoelectric transducers of an electric guitar, the analog or digital output of an EEG monitor, or the video signal from an analog or digital video camera. The interaction signal [111] may also originate from a post-processor associated with Device A [102], such as an analog-to-digital converter, an analog-to-MIDI converter, an amplifier, compressor, or a noise limiter.

The first signal processor [103] may be stand-alone, or physically associated with Device A [102] and/or the second, processor-enabled device, Device B [104]. The first signal processor [103] performs logic, transformation and mapping operations on the interaction signals [111] to generate control signals [112] to direct the operation of Device B [104]. In some cases, these logic, transformation and mapping operations can be predefined (i.e., fixed at runtime), which can result in simplified testing and validation of the system, as well as greater certainty in the output given a specific interaction with device A [102]. In various embodiments, these interactions may be simple physical interactions, such as pressing a button or turning the knob of a volume control. They may also include physiological, biological, psychological, medical, perceptual, and physical measurement or assessment of the user and/or the environment. For example, Device A [102] may have sensors for, and create signals representative of, color, pressure, temperature, speed, rate and degrees of rotation, volume, RBC count, hematocrit, blood glucose level, intensity, tone, frequency, viscosity, voltage, perfusion, elasticity, affect, alertness, rigidity, pulse rate, suppleness, luminance, humidity, and skin turgor, among others. For example, if Device A [102] is a biofeedback device that produces light of a specific spectrum to reflect the user's brain activity, then the interaction signals [111] input to the first signal processor [103] reflect the frequency and amplitude of the user's EEG signals.

The output of the first signal processor [103], the control signal [112], is communicated from the first signal processor [103] to Device B [104], which interacts [113] with its environment [105]. Examples of the interaction between Device B [104] and the environment [113] include, but are not limited to, emission of light, RF, or other radiation, production of sound, applying a torque or pressure, electrifying, cutting, perforating, suturing, or other physical manipulation, as well as manipulations using forces at the atomic and sub-atomic levels. Examples of the environment [105] include, but are not limited to, free space, a semiconductor substrate, the atmosphere, submerged in water or other fluid, in a gas, in the abdominal cavity of a human or animal body, on a battlefield, in a vehicle, and inside a building. Examples of Device B [104] include but are not limited to at least one real or mixed reality weapon system, drone, surgical robot, musical instrument, vehicle, aircraft, or physiologic monitor. In a preferred embodiment of the architecture of FIG. 1, Device B [102] is an at least partially real processor enabled device.

The operation of Device B can be monitored by its effect on its environment through an environment sensor [106] that communicates [115] with a second signal processor [107]. Device B [104] may also communicate directly [114] with the second signal processor. Whether the operation of Device B [104] is monitored directly or from the environment, or both, depends on the nature of the interaction of Device B [104] with its environment [113] and whether Device B [104] is capable of producing a signal [114] indicative of its operation (in addition to the requirements of a particular scenario, such as cost or space constraints). For example, if sub-optimal operation of Device B [104] results in internal overheating, this elevated thermal signal may not be readily detectable by an environment sensor [106]. However, an internal thermistor or similar sensor could provide the basis for a timely overheating signal that could provide the basis for feedback to the user(s) [101].

The second signal processor [107] may share the same circuitry as the first signal processor, use different circuitry housed in the same physical unit, or take the form of a second, separate unit, with inter-unit communications [121]. This inter-unit communication [121] can be used to enable the synchronization of events in the two signal processors [103] [107] and the sharing of functions. This sharing of functions can be useful when the operations performed by the second signal processor [107] are the inverse of operations performed by the first signal processor [103]. It will be apparent to one of ordinary skill in the art in light of this disclosure that synchronization can be performed by a variety of established methods. For example, in the music studio, a world or master clock can be used to perform synchronization. Similarly, a common system clock can be used to synchronize input/output processing and thereby minimize latency. Of course, it should be understood that, even in embodiments where measures are taken to synchronize functions between different components, there may still be some residual latency in the system, as a function of sensor response times, the processing throughput or bandwidth of the signal processors, as well as the nature of the signal path in the environment. For example, a telesurgery system in which the controller and operating units are separated by thousands of miles will have a larger minimum latency compared with a telesurgery system located in one room and with a signal path of only a few meters. Similarly, in some circumstances, there may not be synchronization performed between elements (and there may not be inter-processor communications), for example, in implementations where the first and second signal processors [103][107] are combined in a single physical unit. Accordingly, the discussion of the use of physically separate signal processors, as well as communication and synchronization between the same, should be understood to be illustrative only, and not limiting.

While there are many variations on how the teachings of this disclosure could be implemented, in embodiments following the architecture of FIG. 1, once the second signal processor [107] receives the signals [114][115] indicative of the operation of device B [104] according to the control signals [112], it performs logic, translation and/or mapping functions on those signals to generate output signals [116] [117] which can be communicated to device A [102] and a feedback transducer [108]. These output signals [116][117] can then be used to provide feedback to the user [101] which comprises output [119] in the form characteristic of the output of device A [102]. In some implementations following the architecture of FIG. 1 where the output is provided by device A [102] itself, this provision of feedback might include the isolation element [120] being configured to selectively let through feedback having the characteristic output type of device A [102] if that feedback is generated based on the output signals [116][117] (e.g., by having separate output connections on device A [102], by only allowing transmission of the feedback from the feedback transducer [108], or by some other means). Of course, it should be understood that such selective communication through an isolation element [120] might not be a feature of all implementations following the architecture of FIG. 1. For example, in cases where device A [102] is modified not to produce output of its characteristic type (e.g., an electric guitar with damped strings), the isolation elements might allow through all feedback having the characteristic output type of device A [102].

Of course, it should be understood that not all feedback provided to the user [101] will necessarily have the characteristic output type of device A [102]. In cases where Device A [102] is incapable of providing feedback of sufficient amplitude, complexity, or fidelity to fully indicate the of operation of Device B [104], the feedback transducer [108] may be used to provide supplementary and/or reinforcing feedback [118]. For example, in one application, the feedback transducer [108] could be a audio amplifier and speaker unit to supplement a modest audio feedback signal [119] generated by Device A [102]. In another application, the feedback transducer [108] could also take the form of a 3D virtual reality display that supplements the audio and hepatic feedback [119] delivered by Device A [102]. Further, in some embodiments, the output of device A [102] might be supplemented with output such as provided by device B [104] as a form of training enhancement. For example, in the case where Device B [104] includes a real or simulated manual transmission system on a car, and Device A [102] includes an automatic transmission. Instead of complex hand-foot coordination associated with operating a manual transmission, while listening to the engine, experiencing the forces of acceleration, and perhaps watching a tachometer and speedometer, the interface for Device A [102] could present a much smaller amount of information, for example, an acceleration pedal, speedometer readings, and engine sounds. Such an embodiment might be programmed to gradually introduce elements of Device B [104] (e.g., engine noise) into the feedback provided by device A [102] or the feedback transducer [108]. In this way, if/when the user [101] of the system was faced with directly operating Device B [104], he/she would be familiar with the feedback elements of the device. In some cases it may also be possible that the feedback transducer [108] might provide additional output that enhances the output provided by device A [102]. It should also be understood that the examples given for devices which can be used to provide feedback to the user are illustrative only, and that other types of devices, such as a haptic mechanism, a constricting mechanism, a video projector, a vibrator, a voice synthesizer, a physiologic sound synthesizer, a nebulizer, a light synthesizer, a micromirror device, an electroactive polymer, a forced air generator, a fluid pump, a Peltier or other heater/cooler device, a muscle stimulator, an IV pump, and an implanted medical device could be used as well. As a result, the architecture of FIG. 1, as well as the accompanying discussion, should be understood as being illustrative only, and not implying limits on the scope of possible implementations of the disclosure set forth herein.

Figure 1A:
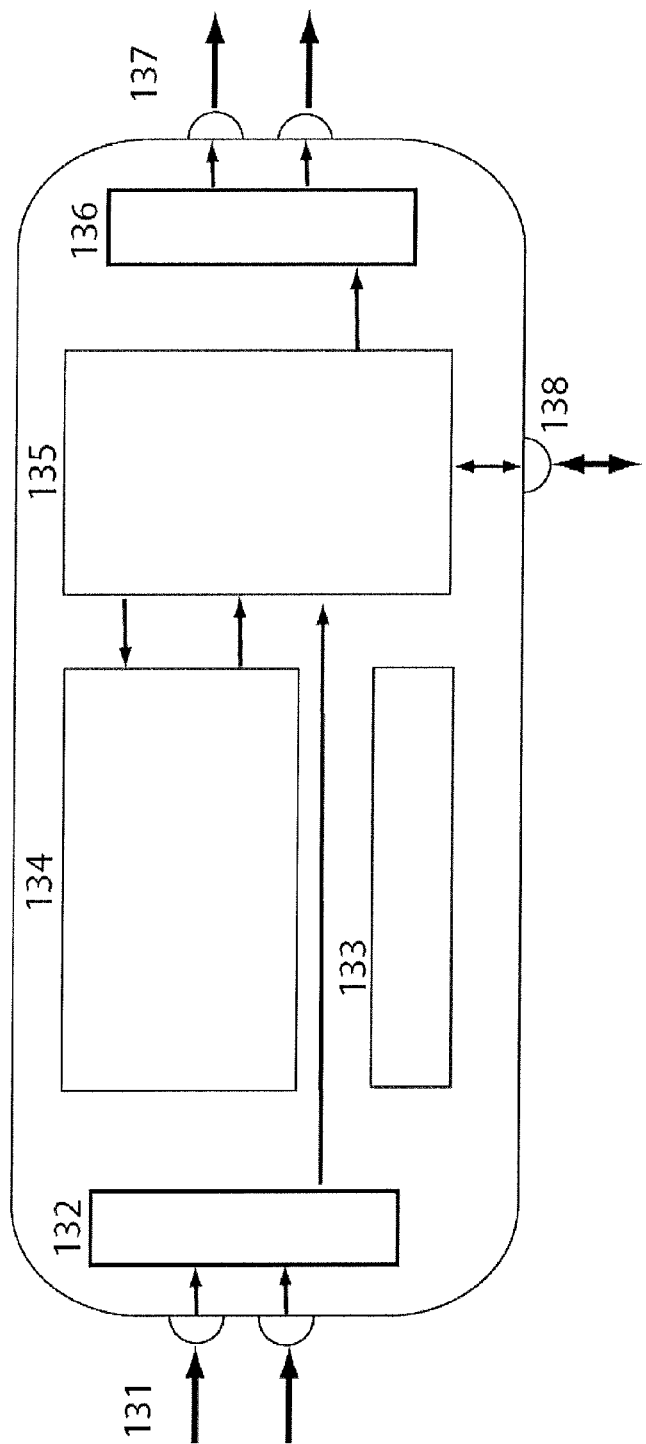
FIG. 1A depicts an exemplary high-level architectural scheme of a signal processor.

Turning now to FIG. 1A, that figure depicts an exemplary high level architecture of a signal processor such as could be used for the signal processors [103][107] depicted in FIG. 1. In the architecture of FIG. 1A, there are depicted one or more input connection(s) [131], an input interface element [132], a power supply [133], a data store [134], a processing element [135], an output interface element [136], at least one output connection [137], and a bidirectional communications link to a second signal processor [138]. As disclosed earlier, the first and second signal processors can be separate units, connected by a communications link for timing, program, and data exchange, as in this illustration. Alternatively, the first and second processor can be contained in one unit, in which case the communications link between signal processors would be contained within the unit, or might be eliminated altogether, depending on the overlap in circuitry and resources which may exist in a particular embodiment. As a result, it should be understood that the architecture shown in FIG. 1A is intended to be illustrative only, and that particular implementations might have fewer (or different) components than those shown in FIG. 1A, depending on the needs of a particular embodiment.

In an implementation following the architecture of FIG. 1, the input connection(s) [131] can be used to provide a hardware level interface with connectors appropriate to the input signal and its source. For example, the input connections [131] may comprise BNC, RCA, 13-pin MIDI, 9-pin serial, USB, Firewire, XRL, digital optical or other types of signal connector. Similarly, the output connections [137] can employ various types of signal connectors as appropriate for the signal source, physical and electrical environment, length of cable run, cable type and dimensions, serviceability requirements, and related factors. Also, depending on the particular implementation, an embodiment of the architecture of FIG. 1A could use the power supply [133] to provide power for the input/output connections (in addition to, or as an alternative to, providing power for other elements, such as the processing element [135]). For example, if the output is USB, then the power supply [133] could provide standard 5V output. Similarly, if the input is an XRL connector and a condenser microphone will be used, then the power supply [133] could provide 48 v phantom power. It is also possible that, depending on the implementation, the input [131] and output [137] connections could use wireless technology, such as Bluetooth, WiFi, ZigBee, or types of wireless communication technology. Combinations are also possible. For example, the input connection [131] may consist of a female USB connector, while the output [137] includes a wireless WiFi link to a nearby wireless access point.

In an architecture such as shown in FIG. 1A, the input and output connections [131][137] could be used for purposes such as communicating with other components (e.g., device A [102] from FIG. 1) and/or providing basic transformation and mapping for inputs and outputs. Similarly, the input interface element [132] could convert an input signal into a digital signal compatible with the processing element [135] through analog-to-digital and digital-to-digital conversion. Possible input signals to the input interface element include, but are not limited to, at least one of analog or digital video, audio, MIDI, RF, DC, AC, TTL signals, light, and PWM signals. In a preferred embodiment of an implementation of the architecture of FIG. 1A, the output to the processing element [135] is digital. The input interface element [132] could also provide for electrical isolation, impedance matching, and/or level normalization (i.e., amplification or attenuation). There are a variety of approaches which could be used in embodiments providing such features. For example, in a preferred embodiment, the input interface element [132] provides electrical isolation by employing optical couplers. Other approaches are also possible, such as transformer coupling the input signal or by using an RF or IR connection between signal source and the signal processor input, or other means known to those of skill in the art.

Continuing with the discussion of the architecture of FIG. 1A, in embodiments following that architecture, logic, transformation, and mapping functions used in indirectly controlling a device such as using the architecture of FIG. 1 can be according to instructions, such as those which could be expressed in the form of hardware, firmware or software which are executed by the processing element [135]. Given the variety of potential embodiments of this disclosure, there a number of different types of processing which the processing element [135] might be used to perform. For example, in an embodiment following the architecture of FIG. 1, the operation of Device B [104] may be more complex, less complex, or of equal complexity to the operation of Device A [102]. As a simple illustration, such a disparity in complexity may be reflected in the number of inputs and outputs supported by each device. Device B [104] may have three inputs, while Device A [102] may have only one, i.e., there could be a one to many mapping. However, each device may have the same number of outputs, i.e., one-to-one mapping, but of different forms and amplitudes—thereby requiring translation. These various types of processing can be implemented using the form of fixed, declarative programs written in a scripting language, a compiled language, or the current state of an adaptive system e.g., a neural network, one or more of which could be reflected by information in the data store [134], instructions encoded in, or executed by the processing element [135], or a combination of the same. Various types of data stores [134] and processing elements [135] could be used in different embodiments. For example, the processing element [135] could be implemented using a Field Programmable Gate Array (FPGA), a dedicated DSP chip, other general purpose controller, or a general purpose microprocessor, depending on the signal bandwidth and latency constraints. Programming language options include C, C++, and Assembler, among others. If a general purpose microprocessor is used, then a real-time operating system, such as RTLinux, would preferably be employed, though, obviously, different implementations might use different operating systems, or might forgo the use of an operating system entirely (e.g., certain implementations where the processing element [135] is implemented in special purpose hardware). The data store [134], if included in a system such as shown, could be implemented using an EEPROM, flash memory, ROM or other type of lookup table of values used by the processing element [135]. Of course, other variations are possible, and will be immediately apparent to those of ordinary skill in the art in light of this disclosure.

Once the control and/or output signals have been generated by the processing element [135], in some embodiments following the architecture of FIG. 1A, the output interface element [136] could be used to provide electrical isolation, impedance matching, level, and signal synthesis as appropriate for the device(s) fed by the signal processor. For example, if the output device requires a ¼ watt signal at 8-ohms impedance, then the output interface element [136] performs digital to analog conversion and delivers a ¼ watt at 8-ohm audio output signal. As per the discussion of the input interface element [132], it will be apparent to one of ordinary skill in the art in light of this disclosure that there are myriad standard methods available for providing the functionality of the output interface element [136].

In a preferred embodiment of the architecture of FIG. 1A, the processing performed by the processing elements [135], which in turn would control the mapping of the inputs and outputs of devices A and B in an embodiment following FIG. 1, would be determined prior to runtime. In such an embodiment, the processing could be defined by providing the user or system administrator with a mapping, translation, and logic utility, which would allow a non-programmer versed in the operation of Devices A and B to adjust the mapping, translation and logic operations to suit individual or group requirements. A simplified example of such a utility is the pointing device utility with Windows XP, which allows the user to change button mappings and motion sensitivity for a mouse or trackball to suit specific hardware and/or user needs. However, in some embodiments, runtime modification of processing might also be possible. For example, in a case where a user is seeking to indirectly control a device to complete a known task, a set of model feedback signals might be compared to the actual feedback signal [114] and/or used to train a neural network which is used to generate the control signals [112] based on the user's interaction signals [111]. Alternatively, desirable characteristics of the operation of the second device (e.g., if the second device is a musical instrument, desirable characteristics might include even tone) could be used in place of the model feedback signals when modifying the mapping during runtime.

Of course, it should be understood that the approaches described as being fixed at runtime, and the approaches with runtime modification are not mutually exclusive. For example, a learning approach such as using neural networks as described above could be used to create a static mapping, which would later be used in a product sold to consumers as a runtime fixed system. Similarly, it should be understood that neither the runtime fixed approaches, or the runtime modifiable approaches are limited to being implemented using a signal processor such as shown in FIG. 1A. For example, in a runtime modifiable approach, there might be supplemental memory elements [134], or connections to external devices (not shown) which could store information such as the feedback signals, control signals, interaction signals, model training data and/or preferences, or other data. Similarly, in runtime fixed embodiments, an appropriate mapping might be burned into the processing element [135], and the memory element [134] might be omitted entirely. Accordingly, the discussion of the runtime fixed and the runtime modifiable implementations, as well as their relationship with the architecture of FIG. 1, should be understood as illustrative only, and not limiting.

Figure 2:
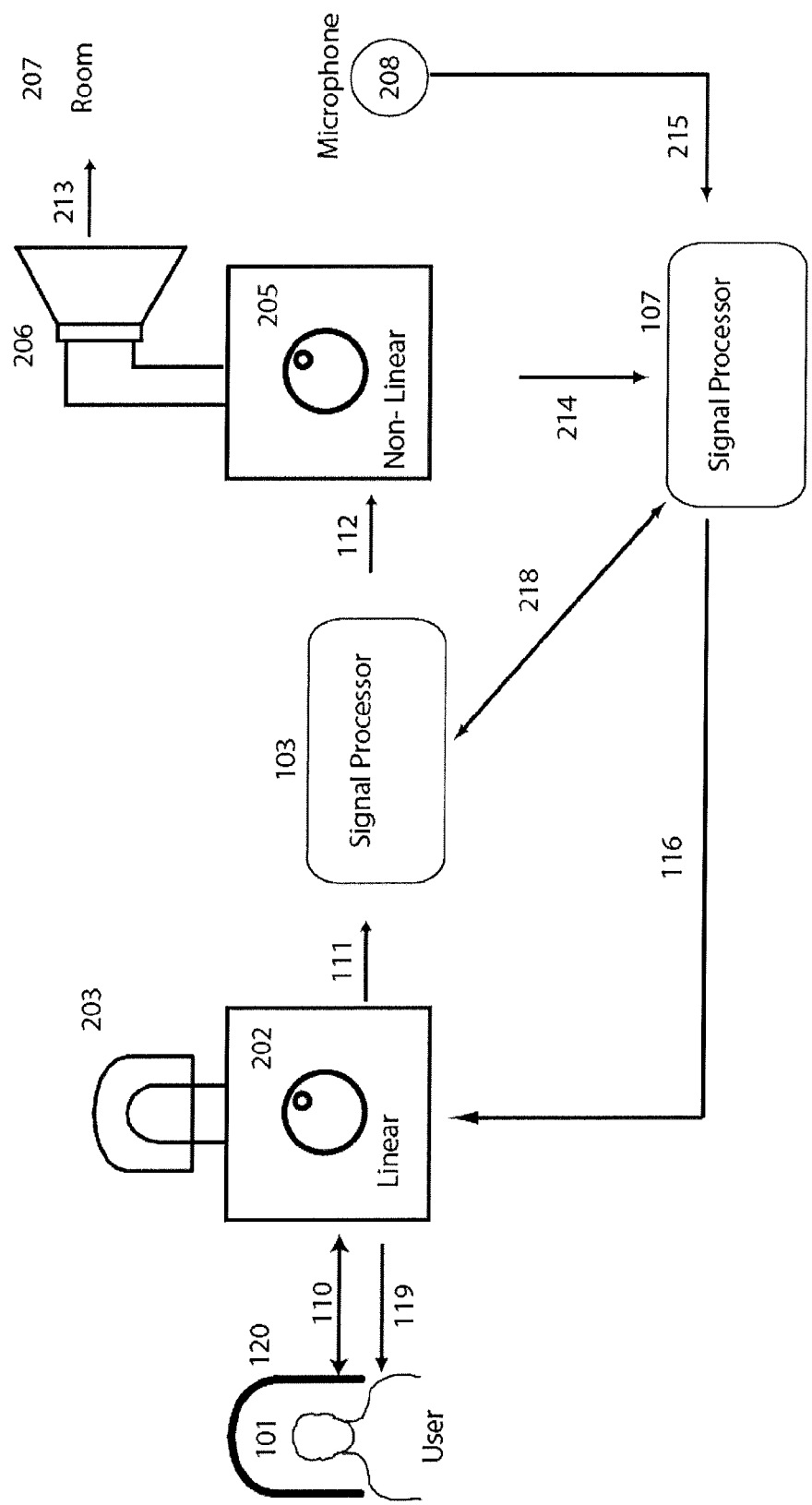
FIG. 2 depicts an exemplary high-level architecture which can be used in indirectly controlling a device though the use of a device with a dissimilar input profile.

Turning now to FIG. 2, that figure depicts a simplified architecture which can be used to demonstrate (in principle) how aspects of the technology disclosed herein can be used to allow a user to indirectly control a device which has a different interface and output type than the device operated by the user. In an embodiment following FIG. 2, one or more users [101] interact directly with a first device, which has an interface that consists of a single-turn linear control [202] (e.g., a control where the bulb's brightness increases linearly in direct proportion to the degrees of clockwise rotation of the control) and a light bulb [203]. When the user [101] rotates the control [202] an interaction signal [111] representing the position of the control knob [202] is sent to the first signal processor [103]. After signal processing, a control signal [112] is communicated to a second device which comprises a non-linear control [205] (e.g., a control where the closer the control is to a full clockwise position, the greater the relative change in sound intensity for a given rotation), which is used to adjust the amplitude of sound emanating from an attached speaker [206].

Once the control signal [112] reaches the second device, the sound emitted by the speaker [206] is modified according to the user's [101] interaction with the first device. The sound in the room [207] holding the speaker [206] is then picked up by a microphone [208] and the resulting signal [215] is transferred to a second signal processor [107]. Alternatively, the second device could communicate a signal indicative of the sound intensity produced [214] to the second signal processor [107]. The second signal processor [107] then generates an output signal [116] that is communicated to the first device and that defines the intensity of the attached light bulb [203]. Note that, in an architecture such as shown in FIG. 2, it may be possible that the output from the second device (i.e., the sound from the speaker [206]) could be detected by the user [101]. In such a case, the isolation element [120] could be used to screen that output from the user [101] so the only feedback the user [101] receives is the output [119] of the first device.

Of course, in practice, the use of sound, light and controls such as described with respect to FIG. 2 would likely be only a part of a larger assembly of varied interface controls which could indirectly control a second device. However, even the abstract example of FIG. 2 highlights potential advantages of the technology for users accustomed to differentiating light intensities and using a linear control knob. Similarly, the abstract example of FIG. 2 demonstrates the flexibility of the disclosed technology in terms of how the operation of a first device can be used to indirectly control a dissimilar second device. For example, in some implementations, it might be possible that, while the control [202] on the first device is being operated in a linear manner, the output [213] of the second device is changing in a non-linear manner (e.g., as the control [202] of the first device is rotated one degree clockwise, the control [205] of the second device would also be rotated one degree clockwise). In such a case, so that the first device would produce the expected output, the second signal processor [107] might transform the detected output of the second device into a linear output signal [116] (e.g., by translating the sound into a decibel level, as decibel level is a nonlinear type of measurement). Alternatively, the first signal processor [103] could map the interaction signals [111] onto control signals [112] in such a manner that the output [213] of the second device changes in a linear manner as the control [202] on the first device is manipulated linearly (e.g., the degrees of rotation of the control [202] for the first device might be modified by a variable scaling factor based on how far the first device is from its minimum position in order to create the control signal [112] for the second device). In such a case, the second signal processor [107] could perform a relatively direct mapping between detected output and output signals [116] for the first device. How the actual mapping and translation will be performed in any particular embodiment will reflect the requirements of that embodiment's use. For example, in a case where it would be beneficial to have the second device perform in a manner which is difficult to obtain from the control [205] for the second device, but easy to obtain from the control [202] of the first device (e.g., in the example of FIG. 2, where a linear increase in sound intensity is required), then an approach which produces equivalent outputs will be preferable. Alternatively, in a case where the second device is one which is unfamiliar to the user [101], and the user [101] wants to leverage his or her existing skill with the first device, then it would likely be preferable to have an approach which produced equivalent controls.

Variations, such as where the output of the second device is mapped so that the feedback provided to the user is not a faithful reproduction of the user's operation of the first device (e.g., transforming the output of the light bulb [203] so that the control [202] of the first device essentially behaves in a non-linear manner), are also possible. Accordingly, the discussion of FIG. 2 and the related mapping should be understood as being illustrative only, and not limiting.

Figure 3:
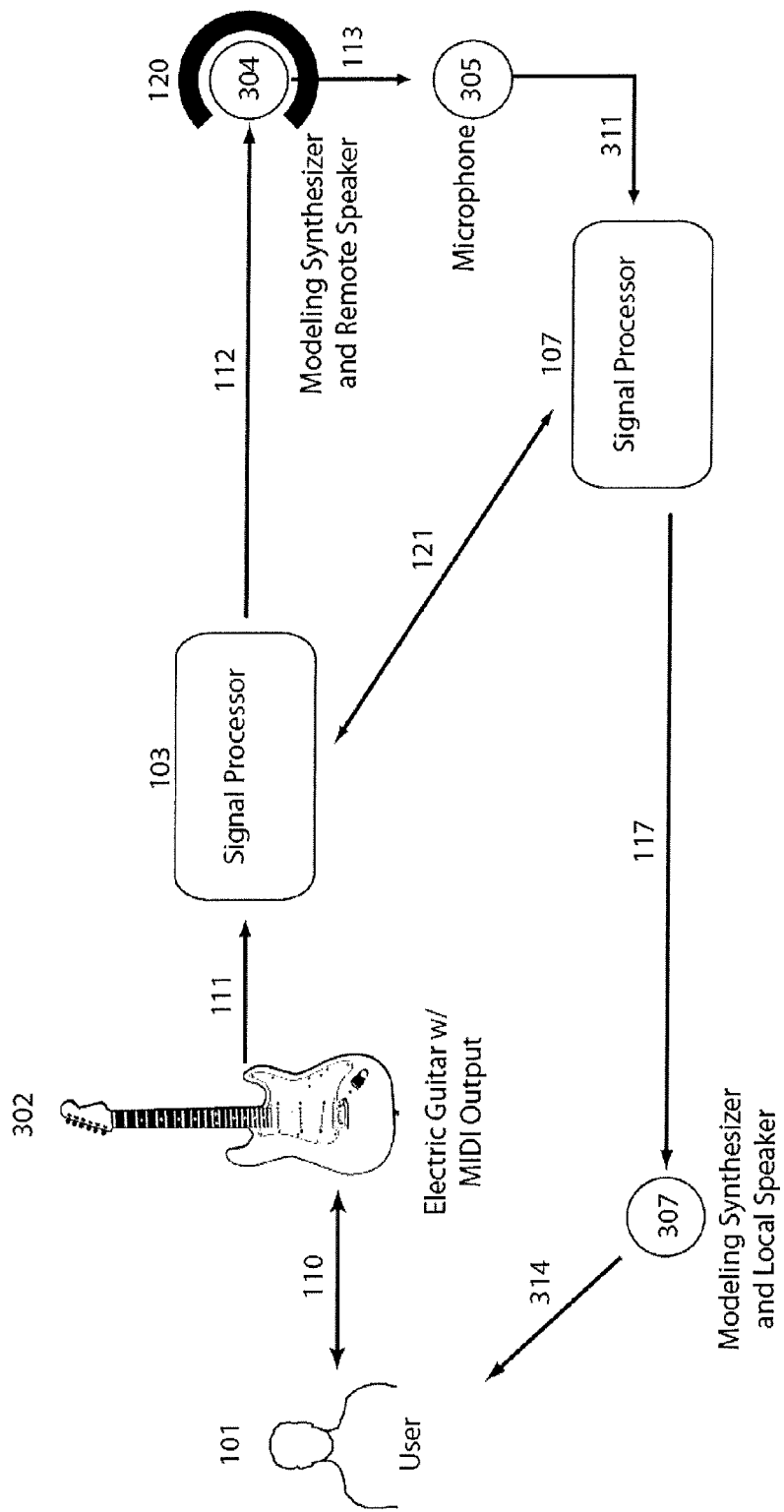
FIG. 3 depicts an exemplary high-level architecture which can be used to remotely control a modeling synthesizer.

Of course, the technology set forth herein is not limited to being implemented in such minimal systems as shown in FIG. 2. As an example of a somewhat more practical application of this disclosure, consider FIG. 3, which depicts an architecture that could be used in implementations where an electric guitar [302] is used to indirectly control a dissimilar modeling synthesizer and remote speaker [304]. In embodiments following such an architecture, the user [101], interacts with [110] an electric guitar [302] that is configured with a standard onboard MIDI interface. When played, the guitar [302] generates an interaction signal [111] (e.g., a MIDI signal) that is sent to the first signal processor [103]. The first signal processor [103] then generates a control signal [112] which is communicated to a modeling synthesizer and speaker [304] that is configured to synthesize sounds of, for example, a wind instrument. In a configuration such as shown in FIG. 3, the output [113] of the synthesizer [304] is shielded by an isolation element [120], which prevents that output [113] from being directly perceived by the user [101], while still allowing it to be detected by a microphone [305] (e.g., the isolation element [120] could be an acoustically isolated room, and the microphone could have a pickup located inside the room to detect the output [113] of the synthesizer [304]). The microphone [305] detects and digitizes the sounds (e.g., wind instrument sounds) emitted by the remote speaker and the digital signals [311] are sent to a second signal processor [107], which performs logic, transformation, and/or mapping functions on the data to derive an output signal [117]. The output signal [117] is communicated to a modeling synthesizer [307] and local speaker, providing the user [101] with local feedback [314] in the form the user expects from the guitar [302]. For example, if the user [101] of the guitar [302] executes a known series of movements, such as a hammer-on followed by a pull-off, on a given string, as dictated by sheet music or tablature designed for the purpose of controlling the modeling synthesizer [304], then the user [101] is made aware of the quality of his performance by listening to the guitar notes produced by the modeling synthesizer and local speaker [307].

It should be understood that there is a variety of methods of driving a modeling synthesizer from an electric guitar, involving, for example, both wired and wireless communications, and that implementations of this disclosure are not limited to any particular approach. Similarly, possible configurations of the modeling synthesizer and local speaker [307] include a clamp-on sensor bar and associated MIDI conversion circuitry that attaches to the guitar [302] body, and fully self-contained units in which the modeling elements are within the guitar [302] body. Similarly, the microphone sensor [305] can be implemented in a variety of manners, and may to encompass a microphone transducer proper and associated amplifier, phantom power source, and other electronics typically associated with live or studio audio capture.

Figure 4:
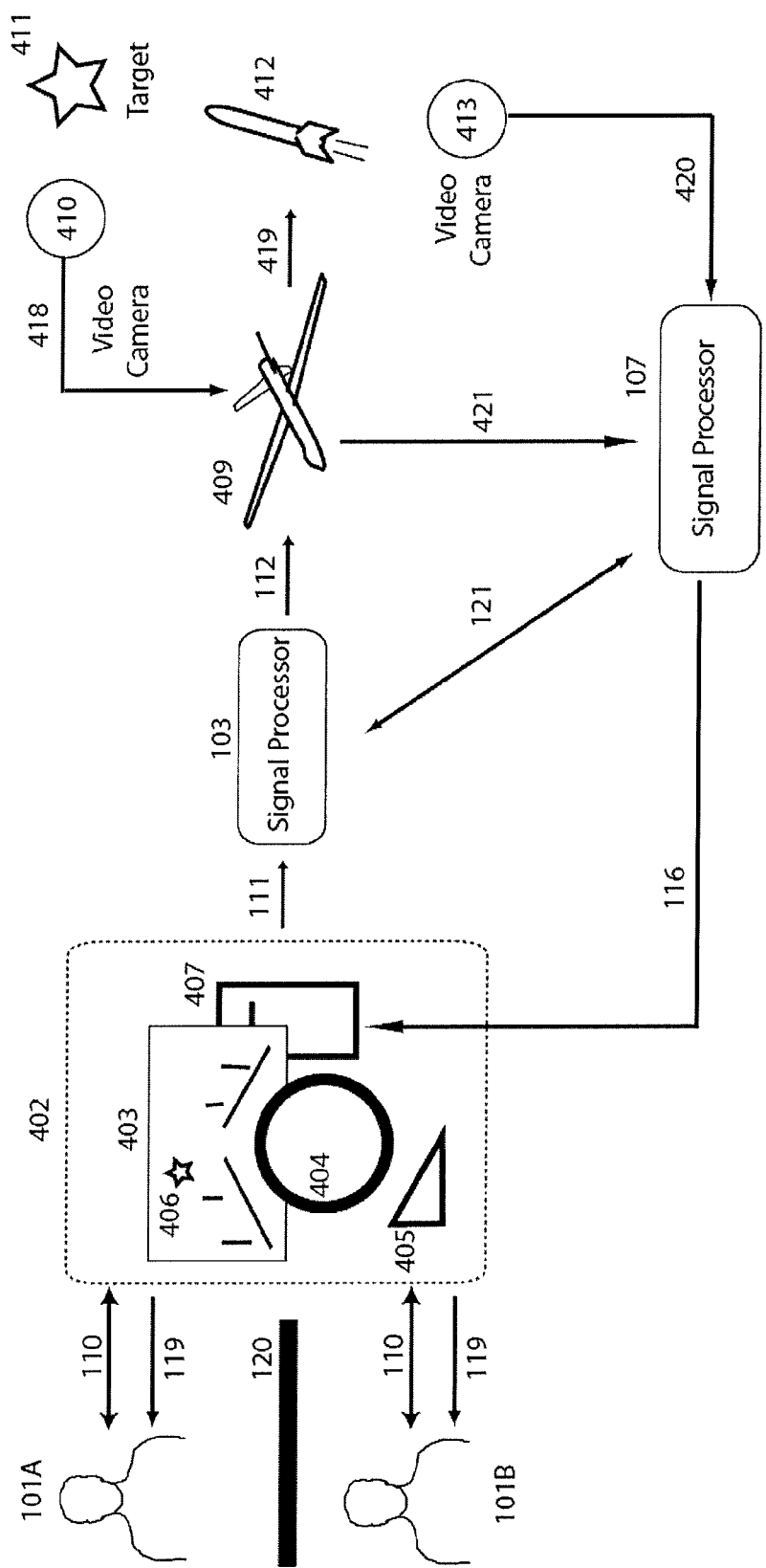
FIG. 4 depicts an exemplary high-level architecture which can be used for remotely controlling unmanned aircraft.

FIG. 4 depicts an exemplary high-level architecture in which aspects of the teachings of this disclosure are applied to a video game [402] and a remotely controlled aircraft or drone. At least one user [101A][101B] interacts [110] with a video game [402] modeled after a familiar driving game. In an embodiment following the architecture of FIG. 4, the game hardware can comprise of a variety of ordinary PC or game console interface peripherals, including a speed pedal [405], a steering wheel [404], a monitor [403], and a handheld, laptop, or desktop computer or dedicated game console [407].

User interaction [110] with the hardware and software constituting the game generates an interaction signal [111] that is communicated to a first signal processor [103]. The output of this signal processor [103] is a control signal [112] which is communicated to a remotely controlled aircraft [409]. This control signal [112] could control a variety of parameters for the remotely controlled aircraft [409], such as motor speed, configuration of the control surfaces of the aircraft, and other aspects of the craft relative to flight, takeoff, and landing. Further, in the illustrated architecture of FIG. 4, the user(s) [101A][101B], through interacting [110] with the game [402], could also define the positioning of an onboard video camera [410] in searching for targets [411] for, in this example, photo reconnaissance or destruction. For photo reconnaissance, data from the video camera [410] (e.g., an onboard video camera for the aircraft [409]) could be communicated to the aircraft [409] and from the aircraft [421] to the second signal processor [107], which might also be stored on the aircraft [409].

While the above discussion focused on a video camera [410] and signal processor [107] which were physically located on the aircraft [409], it is not a requirement for embodiments following the architecture of FIG. 4 that those components be combined. For example, in some implementations, there might be a second camera [413] located on a drone accompanying the aircraft [409] in communication [420] with the second signal processor [107]. That second camera [413] could be used to collect images of the target [411] and the aircraft [409], as well as other information, such as the surrounding environment. In such an implementation, which includes an accompanying drone, the second signal processor [107] may also be located on the accompanying drone, rather than on the aircraft [409]. Of course, other locations are also possible (e.g., a support drone or base, where the aircraft and the accompanying drone have relatively weak transmitters that transmit signals to the support drone for processing and further transmission), and so the discussion of the second camera [413] and the potential accompanying drone should be understood as being illustrative only, and not limiting.

However, regardless of how the various cameras [413][410] in an embodiment of the architecture of FIG. 4 are disposed, in embodiments following that architecture, their output would be used by the second signal processor [107] to create an output signal [116] which would be sent to the video game [402] to provide feedback [119] to the users [101A][101B]. The video game [402] displays target information [406] in a familiar form, and reflects parallel activities performed by the remote aircraft [409] based on the control signal [112]. For example, in some implementations, firing on the target in the game [402] could be mapped to triggering either processing the video feed for reconnaissance or firing [419] a missile [412]. In this type of implementation, what appears on the video game display [403], and is therefore presented [119] to the user(s) [101A][101B] could depend on the success of the real missile [412] destroying the real target [111] (perhaps as determined by a video camera [410] or, in photo reconnaissance mode, of capturing a photo of the target [411]. In the event the signal processors [103][107] are physically separate, a communications channel [121] between the two processors could be used to provide for timing and function sharing. Similarly, the capabilities and functions of the two signal processors [103][107] could vary with the requirements of a particular embodiment. For example, if targets of a specific configuration must be automatically identified in images from the onboard and external cameras (i.e., image recognition) and the targets mapped onto a 3D space within a video game, then the processing could be significant. In contrast, if video is simply fed from the video cameras onto the screen of the game console with only modest filtering or spatial reconstruction, requiring the user to perform pattern recognition, then the burden on the signal processors is lessened, and less expensive/powerful signal processors could be used.

It should be understood that, while the discussion above focused on using an architecture such as shown in FIG. 4 to indirectly control a remote aircraft [409], it is possible that such an architecture could be used for other purposes as well, such as training a user to operate equipment which is unfamiliar. For example, the video game [402] depicted in FIG. 4 could be a simulator for a type of remote aircraft that the user is already familiar with. In such a case, the user's interaction with the simulation could be converted into control signals for a second type of remote aircraft which is unfamiliar to the user. The feedback provided to the user would then be determined by the actual operation of the unfamiliar remote aircraft (or a simulation of the same) as described previously. However, the simulation provided to the user might be configured so that the simulation would gradually transition from the output associated with the familiar type of remote aircraft, to the output associated with the unfamiliar type of remote aircraft (e.g., the type and responsiveness of the controls presented to the user might be altered). Similarly, the output provided by the simulation might be gradually transitioned from the familiar type of remote aircraft to the unfamiliar type (e.g., field of vision and resolution of acquired video data might change). In this way, the technology described herein could be used as a training tool for unfamiliar remote aircraft (or other types of devices) which would allow a user to become competent with operating the remote devices directly.

As another example of a variation on the discussion above, in some implementations it might be possible that the combined efforts of multiple users [101A][101B] might be used to control a remote aircraft [409]. For example, in as shown in the architecture of FIG. 4, the multiple users [101A][101B] might each control a driving game [402] which (after appropriate signal processing) provides the control signal [112] for operating the remote aircraft [409]. In such a case, it might be that the users [101A][101B] would operate physically separate instantiations of the driving game [402], and the interaction signal [111] for the first signal processor [103] would be a combination of the inputs [110] of the first and second users [101A][101B]. Another approach could be where the first and second users [101A][101B] could operate different interfaces (e.g., the game [402] from FIG. 4) to control different aspects of the remote aircraft [409]. For example, the first user [101A] could operate a driving game, the output from which would be used to generate aspects of a control signal [112] that would control the remote aircraft's navigation. Simultaneously, the second user [101B] could operate a fixed path first person shooter game (i.e., a game where the player controls the operation of a weapon, while the movement of the character is performed automatically), the output of which could be used to generate aspects of a control signal [112] that would control the remote aircraft's reconnaissance/weapons systems. In such a case, while the individual players [101A][101B] might not be aware of one another (e.g., they could be isolated by an isolation element [120], such as a visually and acoustically opaque wall between two rooms) their combined operation of the remote aircraft [409] might be reflected on both of their games. For example, in the case of a drone controlled by a combination of driving and shooter interfaces, the navigation of the drone (which is determined by the driving interface) would be reflected in both the progression of the driving game and the path taken in the shooter game. Similarly, the operation of the reconnaissance/weapons systems (which is controlled by the shooter interface) could be reflected both in the score of the race game (e.g., hitting checkpoints) and the second user's ability to eliminate enemies in the shooter.

In yet another approach, multiple users [101A][101B] could operate the same aspects of one or more remote devices. For example, a first user [101A] could use a first device (e.g., a driving game) to direct a group of remote aircraft to follow a pre-determined flight path (e.g., over multiple targets of interest). One or more second users [101B] could use a second device (e.g., a dodging/fighting game) to control the specific movements of the individual remote aircraft. For instance, the first user's operation of the first device could establish a target position (e.g., if the first user turned left in a driving game, then the target position would also move to the left). The second users [101B] could then score points for staying close to the target (e.g., keeping focus on a simulated fighter) and lose points (or lose the game) for failing to avoid obstacles (e.g., dodging punches). This type of embodiment could be useful in cases where two different skill sets are required (e.g., strategic thinking to follow an overall course+ tactical thinking/reflexes to avoid obstacles along the way) and it is easier to train multiple individuals in individual skill sets than a single individual in multiple skill sets. Of course, it should be understood that this embodiment, as well as the other embodiments disclosed herein, is illustrative only, and should not be treated as implying limitations on the potential uses for the technology disclosed herein.

Figure 5:
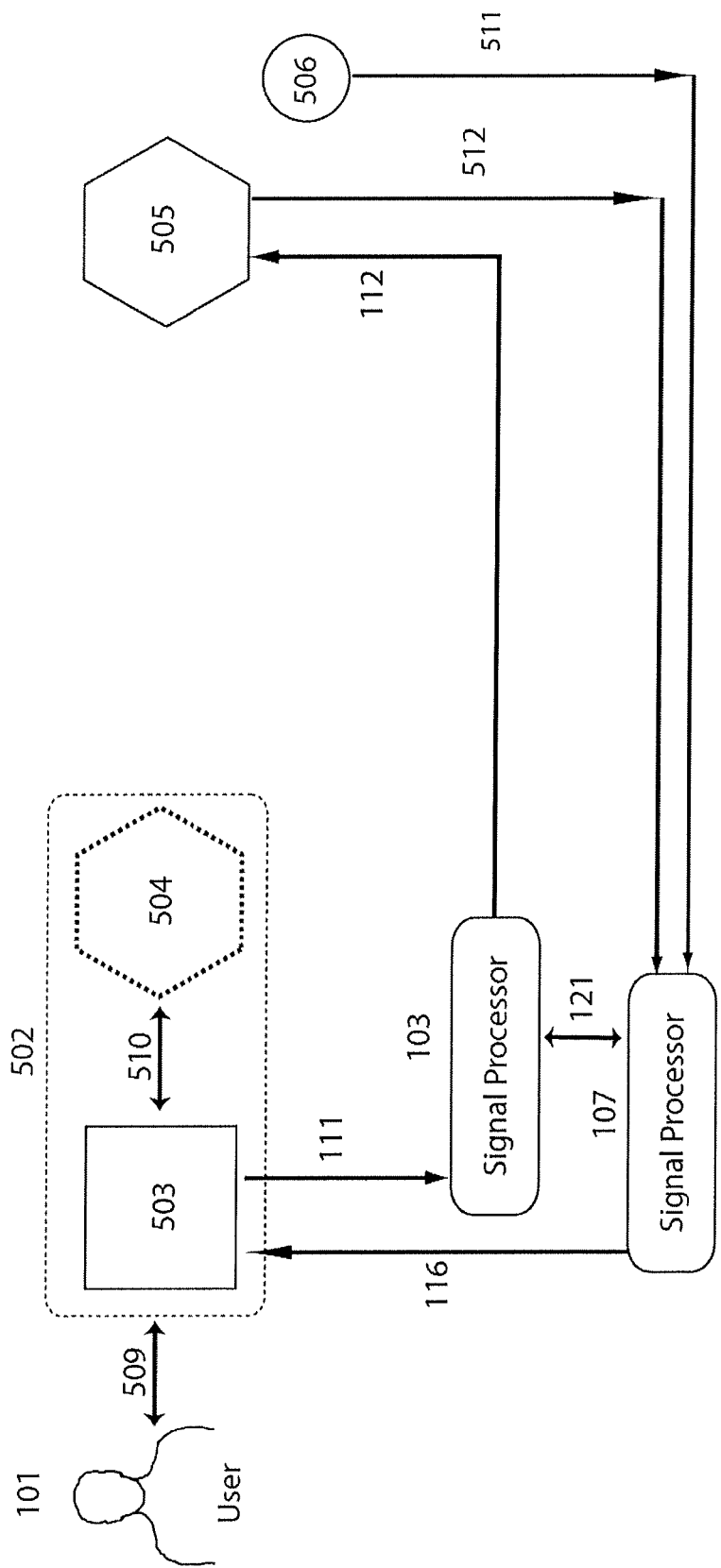
FIG. 5 depicts an exemplary generic high-level architecture which can be utilized in indirect control of robots.

Moving on from the discussion of FIG. 4, FIG. 5 depicts an exemplary generic high-level architectural scheme in which certain aspects of the disclosed technology can be applied to a first and second robot. By way of example to illustrate the architecture of FIG. 5, the following discussion is set forth in the context of remote surgical robots. Using an architecture such as shown in FIG. 5, one or more users [101] could interact [509] with a first surgical robot control unit, [503], the local module of a two-part surgical robot [502]. In the standard configuration, user(s) [101] would interact directly with the local controller, which would communicate [510] with a remote surgical unit [504]. The remote surgical unit [504] would in turn operate on a patient (not shown) according to the user's [101] commands. However, using the techniques set forth herein, instead of controlling the remote surgical unit [504], the user's commands would be sent to a first signal processor [103], and would be translated by that signal processor [103] into control signals [112] which would be communicated to a second remote surgical unit [505] which might, under ordinary circumstances, be controlled by a second type of control unit (not shown). This could be useful in cases where there is a surgeon who is skilled in the operation of the operation of the first surgical control unit, but not in the operation of the second unit. For example, the first unit could include a set of feedback gloves, while the second unit might operate by a joystick interface. Other types of differences between the first and second control units are also possible. For example, the second control unit could differ from the first control unit in terms of complexity, the number of actuators that can be accessed by each control, the granularity of control, number of degrees of freedom controllable for each actuator. The first control unit could hide some of the complexity of the first unit by automating some control tasks, such as tool selection. The first control unit could also enhance the resolution and/or fidelity of the feedback presented to the user, over what the second unit presents. The result would be easier control of the second surgical unit as well as the possibility of controlling multiple second surgical units simultaneously.

In any case, feedback from sensors in the remote surgical unit [512], as well as signals [511] from one or more accessory sensors [506] would be fed to the second signal processor [107], which would create an output signal [116] which would provide feedback to the user [101] in the form associated with the first remote surgical robot [504]. As will be apparent to one of ordinary skill in the art, the number, nature and placement of the accessory sensor(s) [506] depends on the sensors available in the second remote surgical unit [504] relative to the sensors expected by the first surgical robot control unit. For example if the first control unit enables the operator to assess real-time tissue perfusion by providing an optional IR view of the surgical field, and the second surgical unit is equipped with video cameras that respond to only visible light, then an IR camera would be an accessory sensor. Similarly, if the first control unit supports IR imaging in stereo, then two IR cameras could be installed at location of the second control unit, with the angle and orientation determined by the needs of the stereo display in the first control unit.

Of course, it should be understood that the description of FIG. 5 in the context of remote surgical robots is intended to be illustrative only, and that variations on the application discussed above could be implemented based on the disclosure set forth herein. For example, instead of mapping between dissimilar remote surgical units, the architecture of FIG. 5 could be used to map commands from an input device that is not related to surgery into commands for a remote surgical unit (or other type of robot). As an illustration, consider a remote military vessel or installation in which an individual untrained in surgery is required to direct a surgical robot in order to save a fellow crewman. Using an architecture such as discussed with respect to FIG. 5, the untrained individual could direct a surgical by interacting with, for example, an instrumented version of a familiar video game or other device. Similarly, consider a scenario in which surgical robots and similar remotely controlled medical devices are mass produced for use near an active battlefield, site of an earthquake, or a bomb detonation in urban area. Using an architecture such as depicted in FIG. 5, military medics, civilian first responders, and other individuals with minimal knowledge of surgical and related medical techniques could direct the surgical robots and other medical devices by directly interacting with, for example, standard PC controllers and familiar applications that have no direct relation to surgery or medicine.

Figure 6:
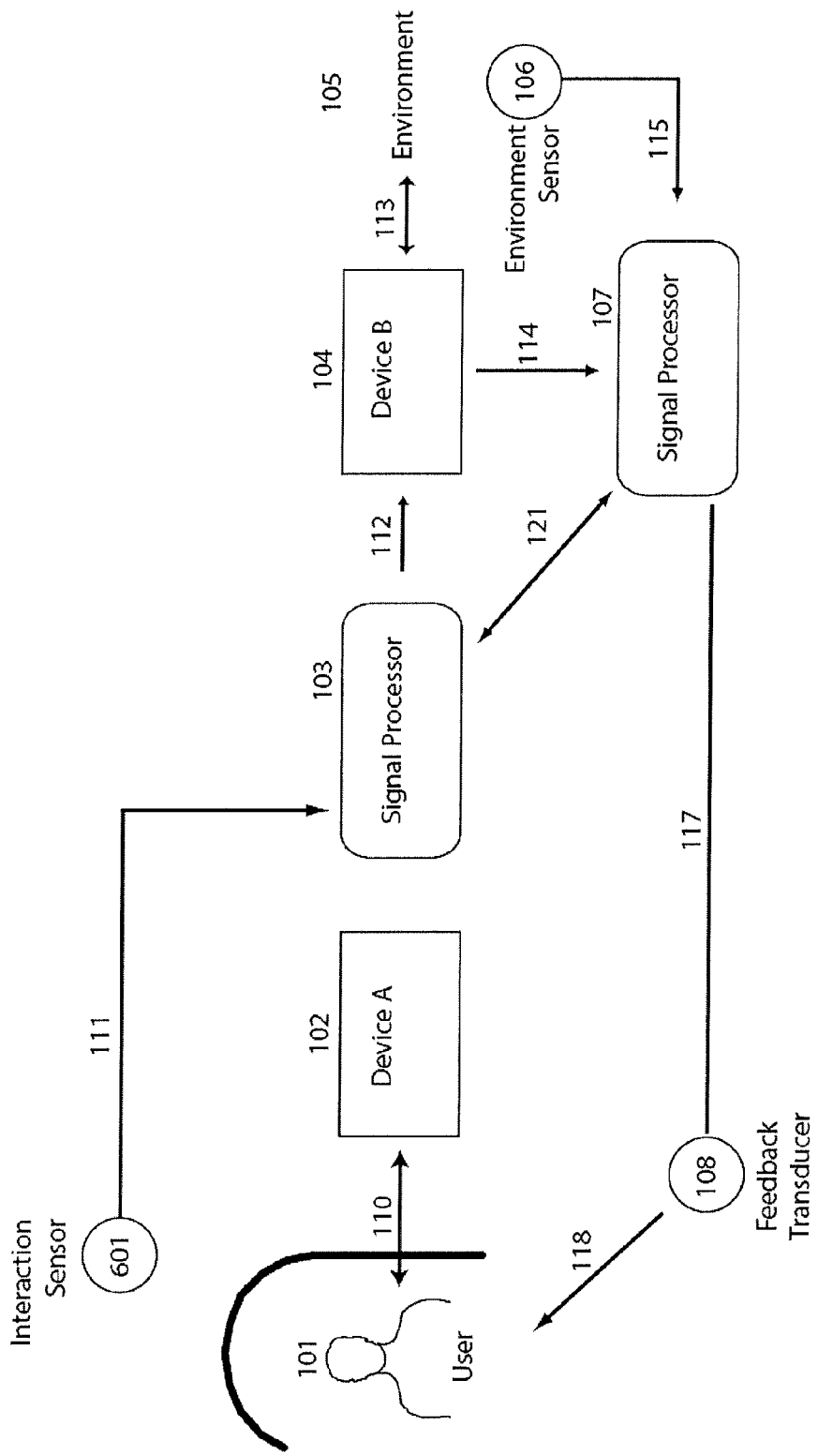
FIG. 6 depicts an exemplary generic high-level architecture in which a user's interaction with a first device is captured by an interaction sensor.

It should also be understood that variations on the architecture of FIG. 5 (as well as those from FIGS. 1-4) are not limited to variations in the devices used in specific implementations, or how specific implementations could be deployed in practice. Instead, it should be understood that systems having different flows of information and control could also be implemented by those of ordinary skill in the art without undue experimentation in light of this disclosure. As an example of this, consider the architecture depicted in FIG. 6. In FIG. 6, as in FIG. 1, a user [101] interacts [110] with a first device [102]. However, while in FIG. 1 the first device [102] was instrumented so as to produce interaction signals [111] to be sent to the first signal processor [103], in the architecture of FIG. 6, the interaction signals [111] are generated by an interaction sensor [601], which detects the effects of the user's interaction with the first device [102] by monitoring the surrounding environment. For example, in the case where the first device [102] is an electric guitar, the interaction sensor [601] could be a microphone which would detect the user's operation of the guitar, and use that information to generate the interaction signals [111]. Other variations are also possible. For example, there could be implementations which combine the architectures of FIGS. 1 and 6, so that the figure signal processor [103] combines interaction signals [111] sent by both the first device [102] and the interaction sensor [601] into a single control signal [112] which is used to drive a second device [104].

Given that the disclosure herein is intended to be illustrative only, and not an exhaustive listing of all possible embodiments of the technology created by the inventors, the protection provided by this document should not be limited to the material explicitly disclosed. Instead, such protection should be understood to be defined by the claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

EXPLICIT DEFINITIONS

When used in the claims, "applying a neural network" should be understood to refer to the act of mapping the input to which the artificial neural network is applied to the nodes in the input layer of the neural network.

When used in the claims, "based on" should be understood to mean that something is determined at least in part by the thing that it is indicated as being "based on." When something is completely determined by a thing, it will be described as being "based EXCLUSIVELY on" the thing.

When used in the claims, the phrase "characteristic control type" should be understood to refer to the general types of operations which are used to control the archetypal form of a device. For example, in the case of an electric guitar, the characteristic control type would be the operations used when playing an electric guitar, such as chords, hammer-ons, and pull-offs.

When used in the claims, the phrase "characteristic output type" should be understood to refer to the general type of output which is associated with the archetypal form of a device. For example, in the case of a video game, the characteristic output type would be the user feedback normally presented when playing the game, such as displaying images on a screen, vibrating a controller, or playing appropriate sound effects.

When used in the claims, "computer memory locations" should be understood to refer to locations on a tangible computer readable medium on which data can be stored and from which that data can be retrieved. It should be understood that while "computer memory locations" are often included in the local storage of desktop personal computers, "computer memory locations" are not required to be associated with desktop (or any other type of) personal computers, and could just as easily be included in other types of devices, such as special purpose signal processors.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims, the phrase "configure a processor" should be understood to refer to the act of designing, adapting or modifying the processor for a specific purpose to which it is configured. For example, in the case of a processor in a desktop personal computer, installing Microsoft WORD on the computer and providing instructions from Microsoft WORD to the processor would configure the processor to enable the computer to function as a word processor.

When used in the claims, the phrase "control signal" should be understood to refer to a signal which is used to direct the operation of a device or machine.

When used in the claims, the term "derive" should be understood to refer to the act of generating, selecting or otherwise obtaining something. In the event that the claims specify that an output is "derived" from some type of input, then the output derived is based at least in part on the input specified in the claims.

When used in the claims, the term "device" should be understood to refer to a real, virtual, or mixed reality object, mechanical and/or electronic system.

When appearing in the claims, a statement that a device is a "familiar device" means that the user of the device has general experience with the device in its archetypal form. That is, the user may not have experience with the specific device, but is experienced with the general form of devices having that type. For example, the user may be familiar with six-string electric guitars, but not a particular six-string electric guitar. It should be understood that, familiarity does not necessarily imply ubiquitous or freely available, in that the user(s) may be familiar with a device, of which there is only one in existence, or where the device is a new model of an archetypal device which had previously been available only in prototype form. Similarly, the fact that a specific device may contain unique or custom hardware, firmware, or software that is unknown to the user(s) does not prevent that device from being a "familiar device." For example, a device may contain an embedded processor for signal generation and onboard transducers to provide the user with more realistic feedback.

When used in the claims, a "feedback signal" should be understood to refer to a signal indicating a result based at least in part on some input which was previously or contemporaneously provided.

When used in the claims, a "feedback transducer" should be understood to refer to a device which changes information related to feedback from one form to another. An example of a "feedback transducer" is a speaker which translates an electrical feedback signal representing sound feedback into actual sound which can be detected by a listener.

When used in the claims, the phrase "generic output type" should be understood to refer to an output which conveys information regarding an underlying signal in a form which is not (necessarily) correlated with the ultimate input provided by a user. For example, in a system where there is a signal processor which maps a user's operation of a first device into control signals for a second device, and the output of the second device is represented (at least in part) by the amplitude of a note played on a speaker regardless of the nature of the first device, then the amplitude of the note would be a "generic output type."

When used in the claims, a statement that something is "independent" of a device, should be understood to mean that the thing which is "independent" is not a part of, and is capable of performing its function without that function being supplemented by the device. For example, if a speaker is described as playing a song "independent" of a guitar, it would mean that the speaker generates the sound of the song without requiring the guitar to generate additional sound. In this example, it should be understood that the speaker is still "independent" of the guitar even if the speaker is physically attached to the guitar, or if the guitar is operable to generate sound which could supplement that provided by the speaker.

When used in the claims, the phrase "interaction signal" should be understood to refer to a signal indicating a user's operation of some thing (i.e., the interaction).

When used in the claims, the phrase "isolation element" should be understood to refer to a component of a system which acts as a filter between a user and some form of information (generally related to the operation of some other component of the system) to which the user would be exposed in the absence of the "isolation element."

When used in the claims, "mapping" should be understood to refer to the linking of variables or parameters into a second set of variables or parameters, for example, the linking of inputs from one system or device(s) to those of another system or device(s). "Mapping" may be one-to-one, one-to-many, and many-to-one. "Mapping" may apply to, but is not limited to: gestures (e.g., hand and other body movements); physiologic variables (e.g., pulse, respiration, body weight, breathing rate, hematocrit, and blood pressure); physical variables (e.g., color, length, voltage, height, mass, velocity, rotation, sound pressure, force); protein sequences (e.g., DNA and RNA sequences); emotion (e.g., anger, mania, and depression); and patterns (e.g., music, physiologic rhythms, still images, and video images).

When used in the claims, the phrase "musical instrument family" should be understood to refer to a general class of musical instruments, such as brass, woodwind, or percussion instruments.

When used in the claims, the phrase "neural network" should be understood to refer to an artificial construct comprising a network of interlinked nodes which can change its structure (often represented as the activation thresholds of nodes, or the weights given to connections between nodes), and therefore the output produced in response to a given input, in response to training data. It should be understood that while a "neural network" includes some types of organic neural networks (e.g., a network composed of nerve cells from an animal which are connected to machines to provide inputs and outputs), it does not include the brain residing in the skull of a live human being, because such a brain residing in a skull of a live human being is not an artificial construct.

When appearing in the claims, an indication that something is "not included" in something else should be understood to mean that the thing "not included" is not fully represented (and may be omitted entirely) from the thing from which it is absent. For example, a statement that information is included in a feedback signal, but is not actually included in output provided to a user should be understood to mean that the underlying information is either completely absent from the output, or is not reproduced with sufficient fidelity to allow the information to be conveyed.

When used in the claims, an "output means for providing feedback to the user in response to the output signal" should be understood as a limitation set forth in means plus function form as set forth in 35 U.S.C. §112 ¶ 6, where the function is to "provide feedback to the user." The devices which can be used to provide output or feedback which were discussed with reference to the architecture of FIG. 1 are examples of "output means for providing feedback to the user in response to the output signal," though it should be understood that the "output means for providing feedback to the user in response to the output signal" are not limited to the specific devices which can be used to provide output or feedback described with reference to the architecture of FIG. 1.

When used in the claims, the term "processor" should be understood to refer to a device or group of devices capable of performing one or more logical and/or physical operations on data to produce a result. A processor may include, for example, a single-core or multi-core microcontroller or microcomputer, configured as an embedded processor or as a part of a mobile, portable, or desktop computer.

When used in the claims, a "processor enabled device" should be understood to refer to a device whose use is facilitated by a processor, such as by generating signals from sensors in, on, or near a device, or training on a device from a distance, and/or interpreting signals fed to the device which can affect or determine its operation.

When used in the claims, "progressively incorporating" should be understood to refer to including an increasing amount of the thing being incorporated over time, potentially with the end effect that the thing being incorporated completely replaces that which it was incorporated into.

When used in the claims, "real time" should be understood to refer to nearly simultaneous in an absolute, physical sense and apparently simultaneously in a perceptual sense.

When used in the claims, the term "robot" should be understood to refer to a real or virtual electro-mechanical system that can sense and manipulate its environment. A robot may consist of a single physical object or a system of components, such as a two-part surgical robot consisting of a local controller and remote operating robot.

When used in the claims, "selectively providing" should be understood to refer to making available the thing being "selectively provided" in a controlled or mediated fashion. For example, a statement that certain aspects of an output are "selectively provided" should be understood to include situations where the output has many aspects, and only a subset of those are provided, as well as situations where all the aspects are provided, but they are provided intermittently, or in a mediated form (e.g., at a lower volume for sound outputs).

When used in the claims, "set of data" should be understood to refer to an identifiable unit of information stored or represented in a manner such that it can be processed by a device such as a computer. Examples of "sets of data" include files, data structures, objects, applications, modules, and records.

When used in the claims, a "signal" should be understood as an indicator, such as pulses of light or a modulated electric current which can convey information between devices or components of a single device.

When used in the claims, "signal processing" should be understood to refer to the analysis, interpretation, and manipulation of signals. "Signal processing" may be performed using a variable application of transformation, mapping, and logic processing to a signal or signals for applications including, but not limited to, signal synthesis, filtering, demodulation, modulation, sequencing, feature extraction, reconstruction, spectrum analysis, digitalization, compression, noise suppression, pattern recognition, and adaptation. "Signal processing" may be analog, discrete time, or digital.

When used in the claims, "signal processor" should be understood to refer to a device or collection of devices which is configured to perform "signal processing" on an input.

When used in the claims, "supplemental output means for supplementing feedback provided in the form of the first characteristic output type" should be understood to be a limitation set forth in means plus function form, as set forth in 35 U.S.C. §112 ¶ 6, where the function is supplementing feedback. The devices which can be used to provide output or feedback discussed with reference to the architecture of FIG. 1 is an example of a "supplemental output means for supplementing feedback provided in the form of the first characteristic output type" though it should be understood that the "supplemental output means for supplementing feedback provided in the form of the first characteristic output type" is not limited to the specific devices which can be used to provide output or feedback which were described with reference to FIG. 1.

Accordingly, I claim:

1. A system comprising:
   a. a first set of computer memory locations storing a first set of data, wherein the first set of data is operable to configure a processor to derive a control signal for a second device from an interaction signal indicative of a user's control of a first device, wherein the first device has a first characteristic control type, and wherein the second device has a second characteristic control type;
   b. a second set of computer memory locations storing a second set of data, wherein the second set of data is operable to configure the processor to derive an output signal encoding output for the first device from a feedback signal indicative of the second device's output when operated according to the control signal, wherein the first device has a first characteristic output type, and wherein the second device has a second characteristic output type;
   c. an output means for providing feedback to the user in response to the output signal, wherein the output means provides feedback to the user in the form of the first characteristic output type; and
   d. an isolation element, the isolation element comprising a physical barrier preventing the second device's output from being perceived by the user, such that the only feedback provided to the user is provided via the output means.

2. The system of claim 1 wherein the output means comprises an supplemental output means for supplementing feedback provided in the form of the first characteristic output type, and wherein the supplemental output means provides the user information included in the feedback signal but not included in the feedback provided in the form of the first characteristic output type using a third output type.

3. The system of claim 2, wherein the isolation element is configured to selectively provide aspects of the output of the second device to the user.

4. The system of claim 1, wherein deriving the control signal for the second device from the interaction signal indicative of the user's control of the first device comprises applying a neural network to the interaction signal, and wherein system comprises a first signal processor which is configured to:
   a. store
      i. interaction signals received from the user;
      ii. feedback signals indicative of the second device's output when operated according to control signals derived from the interaction signals;
   b. determine a training input for the neural network based on a comparison of the feedback signals with a set of model feedback signals; and
   c. update the neural network through application of the training input.

5. The system of claim 1 wherein the first device is a first musical instrument, and wherein the second device is a modeling synthesizer programmed to emulate a second musical instrument having a different musical instrument family than the first musical instrument.

6. The system of claim 1 further comprising an environment sensor operable to detect the user's operation of the first device and generate the interaction signal based on the detected operation.

7. The system of claim 1 wherein the output means comprises a feedback transducer operable to provide feedback to the user independent of the first device.

8. A method comprising:
   a. receiving an interaction signal, wherein the interaction signal is indicative of a user's interaction with a first device;
   b. using a first signal processor, deriving a control signal based on the interaction signal;
   c. communicating the control signal to a second device;
   d. receiving a feedback signal, wherein the feedback signal is indicative of the second device's output when operated according to the control signal;

e. using a second signal processor, deriving an output signal based on the feedback signal;
f. providing an output to the user based on the output signal;
wherein:
a. the first device has a first characteristic output type;
b. the second device has a second characteristic output type which is different from the first characteristic output type;
c. the output provided to the user has the first characteristic output type;
d. the user is isolated from the output of the first device and the second device;
e. the first device is part of a first class of devices;
f. the second device is part of a second class of devices;
g. the user has experience with the first class of devices; and
h. the user does not have experience with the second class of devices.

9. The method of claim 8 comprising progressively incorporating output having the second characteristic output type into the output provided to the user.

10. The method of claim 8, wherein the output provided to the user is provided at least in part by the first device.

11. The method of claim 10, wherein the output provided to the user is provided at least in part by a feedback transducer which is independent of the first device.

12. The method of claim 8, wherein the output provided to the user is provided by a feedback transducer and is not provided by the first device.

13. The method of claim 8, wherein:
a. deriving the control signal for the second device from the interaction signal indicative of the user's interaction with the first device comprises applying a neural network to the interaction signal;
b. the method comprises:
  i. storing interaction signals indicative of the user's interaction with the first device;
  ii. storing feedback signals indicative of the second device's output when operated according to controls signals derived from the interaction signals;
  iii. determining a training input for the neural network based on a comparison of the feedback with a set of model feedback signals, wherein the set of model feedback signals represent output of the second device when used to complete a known task; and
  iv. updating the neural network based on the training input.

14. The method of claim 8, wherein the output provided to the user differs from the first device's normal output based on the interaction between the user and the first device.

15. The method of claim 8, wherein:
a. the method further comprises receiving a second interaction signal, wherein the second interaction signal is indicative of a second user's interaction with a third device; and
b. the control signal is derived based on the interaction signal and the second interaction signal.

16. The method of claim 8, further comprising:
a. receiving a second interaction signal, wherein the second interaction signal is indicative of a second user's interaction with a third device;
b. deriving a second control signal based on the second interaction signal;
c. communicating the second control signal to the second device;
d. receiving a second feedback signal, wherein the second feedback signal is indicative of a second output when a second aspect of the second device is operated according to the second control signal;
e. deriving a second output signal based on the second feedback signal;
f. providing a second output to the second user based on the second output signal.

17. The method of claim 8, wherein:
a. the method further comprises:
  i. deriving a second control signal based on the interaction signal;
  ii. providing the second control signal to a third device, wherein the third device is part of the second class of devices; and
  iii. receiving a second interaction signal, wherein the second interaction signal is indicative of a second user's interaction with a fourth device;
b. the control signal is derived based on the interaction signal and the second interaction signal.

* * * * *